United States Patent
Oba et al.

(10) Patent No.: US 9,079,456 B2
(45) Date of Patent: Jul. 14, 2015

(54) LOCK RING MOUNTING/DEMOUNTING JIG

(71) Applicant: TOPY KOGYO KABUSHIKI KAISHA, Tokyo (JP)

(72) Inventors: Kentaro Oba, Tokyo (JP); Yukio Nakamura, Tokyo (JP); Etsuro Sugisaki, Tokyo (JP)

(73) Assignee: TOPY KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/094,755

(22) Filed: Dec. 2, 2013

(65) Prior Publication Data

US 2014/0150229 A1 Jun. 5, 2014

Related U.S. Application Data

(63) Continuation-in-part of application No. 12/673,732, filed as application No. PCT/JP2008/064519 on Aug. 13, 2008, now abandoned.

(30) Foreign Application Priority Data

Aug. 14, 2007 (JP) ................... 2007-211262
Aug. 12, 2008 (JP) ................... 2008-207873

(51) Int. Cl.
  *B23P 19/02* (2006.01)
  *B60B 25/04* (2006.01)
  *B60B 25/20* (2006.01)

(52) U.S. Cl.
  CPC ............... *B60B 25/04* (2013.01); *B60B 25/20* (2013.01); *Y10T 29/53657* (2015.01)

(58) Field of Classification Search
  USPC ............................. 29/234, 235, 700
  See application file for complete search history.

(56) References Cited

U.S. PATENT DOCUMENTS 1,600,222 A   9/1926   Fox
2,731,063 A   1/1956   Powers
(Continued)

FOREIGN PATENT DOCUMENTS

JP   4-76334 U      7/1992
JP   2000-108603 A   4/2000
(Continued)

OTHER PUBLICATIONS

International Search Report, directed to PCT/JP2008/064519 by Japanese Patent Office, mailed on Nov. 11, 2008, 1 page.

*Primary Examiner* — Lee D Wilson
*Assistant Examiner* — Shantese McDonald
(74) *Attorney, Agent, or Firm* — Kratz, Quintos & Hanson, LLP

(57) ABSTRACT

An object of the present invention is to provide a jig that does not require an operator to hold a lock ring against the elastic repulsion force of the lock ring that attempts to contract in a radial direction when the lock ring is attached to a rim base, the jig that is safe because there is no need for the operator to support the weight of the lock ring and can maintain a state in which, when the space between the ends of the lock ring is increased, the inside diameter side of the lock ring is a perfect circle or is close to a perfect circle. Thus, a lock ring mounting/demounting jig of the present invention is formed of a pair of jigs, the pair of jigs can be attached at both ends (4a, 4b) of a lock ring (4) and on the radial outside of the lock ring (4), and the angle formed by the direction in which the space between the pair of jigs expands and contracts and the longitudinal direction of each jig is changeable.

7 Claims, 13 Drawing Sheets

(56) References Cited

U.S. PATENT DOCUMENTS

| | | | |
|---|---|---|---|
| 2,816,603 A * | 12/1957 | Swarthout | 157/1.21 |
| 2,822,021 A | 2/1958 | Shipman et al. | |
| 3,608,607 A | 9/1971 | Gerbeth | |
| 4,209,052 A | 6/1980 | French | |
| 4,530,387 A | 7/1985 | Osawa | |
| 4,552,194 A | 11/1985 | Brown et al. | |
| 4,574,859 A | 3/1986 | Smith | |
| 4,757,851 A | 7/1988 | Van Den Abeele | |
| 4,911,216 A | 3/1990 | Yamoto et al. | |
| 4,995,673 A | 2/1991 | DuBost | |
| 5,107,914 A | 4/1992 | Yamoto et al. | |
| 5,984,421 A | 11/1999 | Proctor | |
| 6,296,320 B1 * | 10/2001 | Miyashita et al. | 301/95.105 |
| 6,715,523 B2 | 4/2004 | Oba et al. | |
| 6,786,259 B2 | 9/2004 | Vehar et al. | |
| 6,793,293 B2 | 9/2004 | Bunnow et al. | |
| 7,040,365 B2 | 5/2006 | Lust | |
| 8,347,929 B2 | 1/2013 | Oba | |
| 2003/0160501 A1 | 8/2003 | Lust | |
| 2010/0164275 A1 | 7/2010 | Oba et al. | |

FOREIGN PATENT DOCUMENTS

| | | |
|---|---|---|
| JP | 2002-327877 A | 11/2002 |
| SU | 1530490 A | 12/1989 |

* cited by examiner

LOCK RING MOUNTING/DEMOUNTING JIG

CROSS REFERENCE TO RELATED APPLICATIONS

This application is a continuation-in-part (CIP) application of U.S. patent application Ser. No. 12/673,732 filed on Feb. 16, 2010 and that application is the National Stage of International Application No. PCT/JP/2008/64519, filed on Aug. 13, 2008. Therefore, it is believed that this continuation-in-part application is copending with the prior application. The disclosures of U.S. patent application Ser. No. 12/673,732 and International Application No. PCT/JP/2008/64519 are hereby incorporated by reference.

TECHNICAL FIELD

The present invention relates to a multi-piece rim to be fitted to a tire for use in a construction machine or mining machine, and particularly, a multi-piece rim to be fitted to a tire for use in a large-sized construction machine or mining machine.

BACKGROUND ART

The tire for use in the large-sized construction machine or mining machine differs in rigidity from a tire for use in a passenger car, so that the tire for use in the large-sized construction machine or mining machine does not fit into a single-piece rim on many occasions. For this reason, a multi-piece rim is often used in the large-sized construction machine or mining machine.

In FIG. 19, there is shown a construction of such a multi-piece rim. In FIG. 19, a multi-piece rim 100J has a rim base 1, a side ring 2 provided on the right and left sides of a tire, respectively, a bead seat band 3 and a lock ring 4. An end of the rim base 1, on a side thereof, adjacent the lock ring 4, (the right-side end of the rim base 1, in FIG. 19) is called a gutter band 11. A back flange 12 is formed at an end of the rim base 1, on the left side thereof. Further, in FIG. 19, a construction for fitting the multi-piece rim to a side of the tire, adjacent to the construction machine or the mining machine, (to a hub) is not illustrated.

In FIG. 19, when air is pumped into a tire 6, and air pressure in the tire 6 rises, the tire is inflated in both the right and left directions FIG. 19, inducing the respective side rings 2 on the left and right sides of the tire, in FIG. 19, to move in the right and left directions, respectively, whereupon the bead seat band 3 moves in the direction of the arrow Y.

The lock ring 4 is fitted into a groove 11a formed in the gutter band 11, and the gutter band 11 is formed integrally with the rim base 1. Accordingly, the lock ring 4 restricts movement of the side ring 2, and the bead seat band 3, provided on the right side, toward the right-hand side in FIG. 19.

FIG. 20 shows the lock ring 4 formed as a single component (single piece). The lock ring 4 in a single piece has elasticity, particularly, elastic repulsion force acting in the direction of contraction occurring in the direction of the arrow R in FIG. 20 (inwardly in the radial direction), and a break 4s is formed at one spot thereof. However, with the lock ring 4 in a single piece state, that is, when it is not fitted to a rim, the break 4s is closed by the agency of the elastic repulsion force of the lock ring 4.

Unless the lock ring 4 has the elastic repulsion force acting in the direction of contraction occurring inwardly in the radial direction (in the direction of the arrow R in FIG. 20), there is the risk that the lock ring 4 while in use is forced out of the groove 11a (refer to FIG. 19) formed in the gutter band 11. By the agency of the elastic repulsion force causing contraction in the radial direction (in the direction of the arrow R in FIG. 20), the lock ring 4 remains fitted in, and held by the groove 11a.

Herein, in some large-sized construction machine or mining machine, double tires are provided on a rear wheel side thereof. The double tires are constructed such that a tire and a rim are provided on both the inner and outer sides thereof.

Also, in the case where such a lock ring 4 is to be attached to the multi-piece rim on the outer side or the inner side, it is required that the lock ring is fitted into the groove of the gutter band by causing the lock ring 4 to pass through a rim base of the multi-piece rim on the outer side while holding the lock ring must be maintained a large size in the radial direction thereof (in the direction of the arrow R in FIG. 20) against the urging of elastic repulsion force (the elastic repulsion force causing the contraction in the direction of the arrow R in FIG. 52).

Herein, since there is the case where the lock ring 4 has a mass as large as, for example, on the order of 50 kg, it is extremely difficult to hold the lock ring 4 so heavy in weight while resisting the elastic repulsion force urging the contraction in the radial direction and to dispose the same at a predetermined position, and excessive labor will be required.

As other prior art, there has been proposed, for example, a multi-piece rim disc wheel wherein a rim base, a gutter band, first and second center bands, a disc, and a back flange are joined together by use of complete joint penetration butt welding, capable of coping with an increase in payload (refer to Patent Publication 1).

Such prior art can be useful, however, it does not eliminate a problem associated with mounting/demounting of the lock ring, described as above.

Patent Publication 1: JP-A No. 2000-108603

DISCLOSURE OF THE INVENTION

Problems to be Solved by the Invention

The present invention has been proposed in view of the problems of the above-described related art, and an object thereof is to provide a jig that does not require an operator to hold a lock ring against the elastic repulsion force of the lock ring that attempts to contract in a radial direction when the lock ring is attached to a rim base, the jig that is safe because there is no need for the operator to support the weight of the lock ring and can maintain a state in which, when the space between the ends of the lock ring is increased, the inside diameter side of the lock ring is a perfect circle or is close to a perfect circle.

Means of Solving the Problems

A lock ring mounting/demounting jig of the present invention is characterized in that the lock ring mounting/demounting jig is formed of a pair of jigs, the pair of jigs (41, 42) can be attached at both ends (4a, 4b) of a lock ring (4) and on the radial outside of the lock ring (4), the angle formed by the direction in which the space between the pair of jigs expands and contracts and the longitudinal direction of each jig is changeable, and centers (rotation centers X1, X2) with respect to which the angle changes is located on a central axis (8C) of a bolt (8) that connects the jigs (41, 42).

Here, at both ends of the bolt (8), socket tools may be provided.

Moreover, it is preferable that a screw thread of the bolt (8) is a trapezoidal thread which allows the bolt (8) to rotate easily even when a load is acting thereon. However, it is also possible to choose a metric thread or other types of screw thread.

In the present invention, it is preferable that a tightening structure is provided also in a target member (the lock ring 4) that is fixed by the jigs (41, 42). More specifically, it is preferable that female screw holes (4m) are formed at both ends (4a, 4b) of the lock ring (4), fixing bolts (B2) threadably engage the female screw holes (4m), and the fixing bolts (B2) are placed through through-holes (41Bf, 42Bf) formed in support members (41Bc, 42Bc) of the jigs (41, 42).

Moreover, it is preferable that each of the pair of jigs is further divided into two parts (434, 436), and the lock ring (4) is fixed by being clamped (sandwiched) between the two parts (434, 436). (Refer to FIG. 17.)

In that case, it is preferable that the two parts (434, 436) have formed therein grooves (434U, 436U) of U-shaped cross section, and the two parts (434, 436) clamp (sandwich) the lock ring (4) in a state in which the lock ring (4) is inserted in the grooves of U-shaped cross section. (Refer to FIG. 17.)

In the present invention, it is preferable that a rod-like expansion member (member for stretching) (a screw bolt 8) with a male screw portion (81) is provided, wherein one (41) of the pair of jigs includes a support mechanism (41D) that rotatably supports the expansion member (8) and supports a thrust acting on the expansion member (8), in the other (42) of the pair of jigs, a female screw hole (42Cc) threadably engaging the male screw portion (81) of the expansion member (8) is formed, and the space between the pair of jigs (41, 42) expands or contracts by rotation of the expansion member (8).

Alternatively, it is preferable that the expansion member (8) includes two male screw portions in which male screws, of which one is opposite in direction to the other, are formed, in each of the pair of jigs, a female screw hole is formed, female screws of the female screw holes in the pair of jigs are opposite in direction, one male screw portion of the expansion member threadably engages the female screw hole of one jig, the other male screw portion of the expansion member threadably engages the female screw hole of the other jig, and the space between the pair of jigs expands or contracts by rotation of the expansion member.

In the present invention, each of the pair of jigs may be attached to the outer side (the arrow Y-side of FIG. 19) of a vehicle with respect to the axial direction of a rim base (1) to which the lock ring (4) is attached.

In addition to this, in place of making the angle formed by the direction (the axial direction of the screw bolt 8) in which the space between the pair of jigs expands and contracts and the longitudinal direction of each jig (41, 42) changeable, the angle formed by the direction in which the space between the pair of jigs expands and contracts and the longitudinal direction of each jig may be fixed (refer to FIG. 13). Incidentally, it is preferable that the lock ring mounting/demounting jig of the present invention can be disassembled, and, when a component part is damaged or worn away, the component part can be replaced.

Effects of the Invention

With the invention having such a construction as described in the foregoing, since the jigs in pairs, mounted on the respective ends (4a, 4b) of the lock ring (4) are constructed such that the space between the pair of jigs is expandable, it is possible to maintain with ease and certainty a state where the inside diameter of the lock ring (4) (the inside diameter of the lock ring at the apex of the protrusion 4t; ΦD1) is larger than the outside diameter (ΦD2) of the gutter band (11) at the time of mounting and demounting the lock ring 4.

For example, with a construction in which a rod-like expansion member (for example, a screw bolt 8) with a male screw portion (81) is provided, one (41) of the pair of jigs includes a support mechanism (41D) that rotatably supports the expansion member (8) and supports a thrust acting on the expansion member (8), in the other (42) of the pair of jigs, a female screw hole (42Cc) threadably engaging the male screw portion (81) of the expansion member (8) is formed, and the space between the pair of jigs expands or contracts by rotation of the expansion member (8). Therefore, it is possible to increase the distance (L) between end faces (4ae, 4be) of the lock ring while pushing against the elastic repulsion force of the lock ring (4) that attempts to contract in a radial direction by rotating the expansion member (8), and make a distance between a pair (40) of jigs (41, 42) attached to lock ring ends (4a, 4b) maintain easily and reliably a state in which the inside diameter (the inside diameter of the protrusion 4t of the lock ring: øD1) of the lock ring (4) is larger than the outside diameter (øD2) of the gutter band (11).

Hence, it is possible to eliminate the need for forcing a worker to carry out a job of holding a lock ring so as to be disposed at a predetermined position while resisting the elastic repulsion force urging contraction of the lock ring, inward in the radial direction, as in the case of mounting a single-piece lock ring in the past, the job being extremely difficult and requiring excessive labor, so that the job can be easily and safely carried out.

Further, with the invention, the protrusion (4t) in the region in close proximity to the respective ends of the lock ring (4) is engaged with the groove (11a) of the gutter band (11), and the jigs (41, 42) are caused to approach each other by turning an expansion member (8) to thereby decrease the distance (L) between the respective end faces (4ae, 4be) of the lock ring (4), whereupon the lock ring (4) can be engaged with the lock ring groove (11a) of the gutter band (11), along the whole circumference of the lock ring (4). For this reason, it is only during a brief period of such a job as described above that the lock ring (4) need be propped up, so that there is no need for a worker to prop up a heavy lock ring for many hours while resisting the elastic repulsion force of the lock ring upon mounting the lock ring (4) at the predetermined position, and a whole work can be easily and safely carried out.

Still further, with the invention, if the jigs (41, 42) are caused to approach each other by, for example, turning the expansion member (8), the lock ring (4) can be engaged with the lock ring groove (11a) by the agency of the elastic repulsion force tending to contract inward in the radial direction.

Accordingly, engagement of the lock ring (4) against the lock ring groove (11a) is ensured, and there will be no possibility that the lock ring is disengaged from the lock ring groove (11a) by the agency of force caused by air pressure of a tire, acting in an axial direction, (force in the direction of the arrow Y in FIG. 19) when air is pumped into the tire.

Since the lock ring (4) is engaged with the lock ring groove 11a of the gutter band 11 with certainty, the tire (6) can be accurately assembled with the rim (100).

Still further, in a case that the lock ring is demounted by applying the jigs of the present invention, as is the case with the method for mounting the lock ring which method is described in the foregoing, the respective end faces (4ae, 4be) of the lock ring are parted from each other by turning, for example, the expansion members (8) to thereby increase the distance (L) between the respective end faces (4ae, 4be) of the lock ring, and by maintaining such the situation, it is possible to maintain a state where the inside diameter of the lock ring (4) (the inside diameter of the lock ring at the apex of the protrusion 4t: (ΦD1) is larger than the outside diameter (ΦD2) of the gutter band (11).

Hence, it is possible to eliminate the need for forcing a worker to carry out the job of holding a lock ring so as to be disposed at a predetermined position while resisting the elastic repulsion force urging contraction of the lock ring, inward in the radial direction, as in the case of mounting the single-piece lock ring in the past, the job being extremely difficult and requiring excessive labor, so that the job can be easily and safely carried out.

Moreover, according to the present invention, since the angle formed by the direction in which the space (L) between a pair of jigs expands and contracts and the longitudinal direction of each jig is changeable, when the space (L) between the jigs is made to expand and contract (is extended or increased), the tangential direction (A4ae: FIG. 14) at an end of the lock ring (4) is maintained at a direction that is always perpendicular to the radial direction of the lock ring (4). As a result, a circular state (a circle with an inside diameter of øC in FIG. 14) is easily maintained on the inside diameter side of the lock ring (4).

The shape of the lock ring (4) keeps from changing into a distorted elliptical shape and makes it possible to increase or decrease the diameter in a state in which the lock ring (4) is a perfect circle or is close to a perfect circle.

BEST MODE FOR CARRYING OUT THE INVENTION

Embodiments of the invention are described hereinafter with reference to the accompanying drawings.

Figure 1:
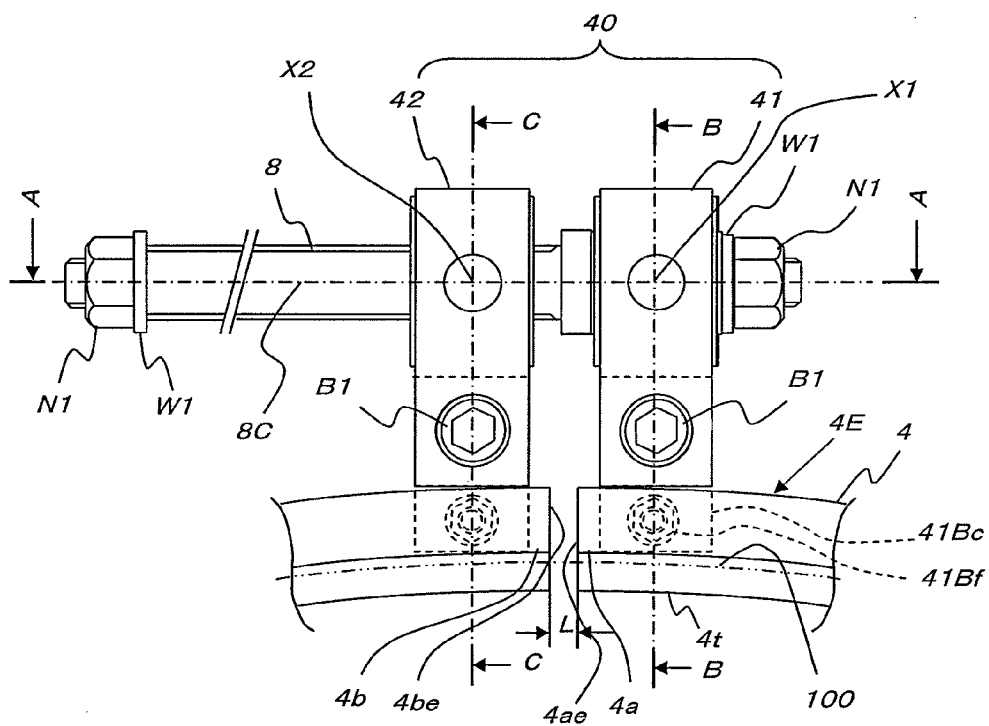
FIG. 1 is a front view showing the principal part of a first embodiment of the invention.

In FIG. 1, the lock ring mounting/demounting jigs of an embodiment of the present invention are mounted respectively to ends 4a, 4b of a lock ring 4 mounted on a gutter band 11 (not shown in FIG. 1) of rim 100.

In FIG. 1, jigs 41, 42 are mounted on the ends 4a, 4b of the lock ring 4, respectively. The jig 40 for mounting/demounting the lock ring 4 is constructed by the jigs 41, 42, in pairs.

In FIG. 1, the jigs 41 and 42 are connected to each other by a bolt 8, and rotation centers X1 and X2 (the centers with respect to which an angle, which will be described later, changes) of the jigs 41 and 42 are located on a central axis 8C of the bolt 8.

Figure 2:
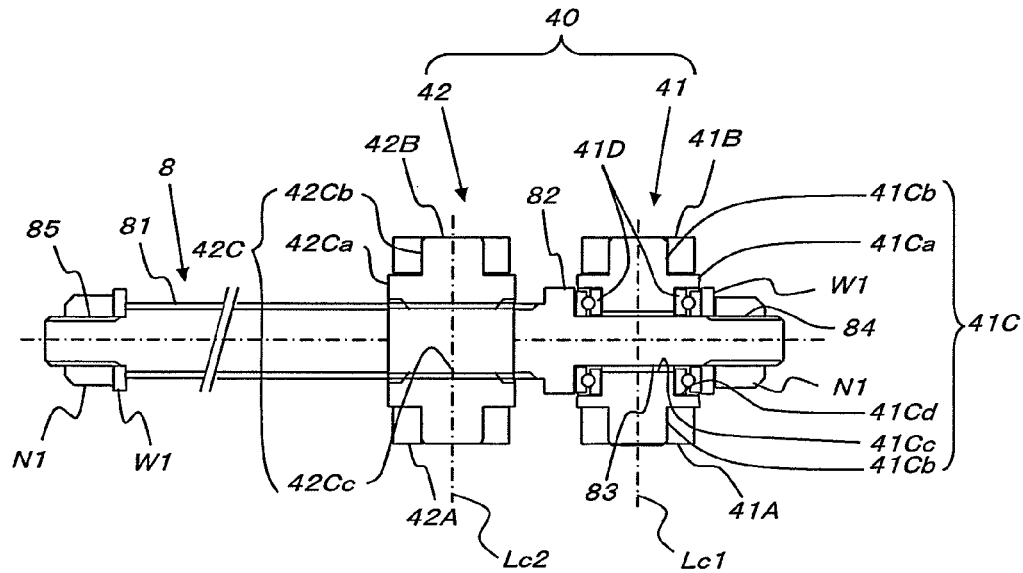
FIG. 2 is a sectional view from arrow A in FIG. 1.
Figure 3:
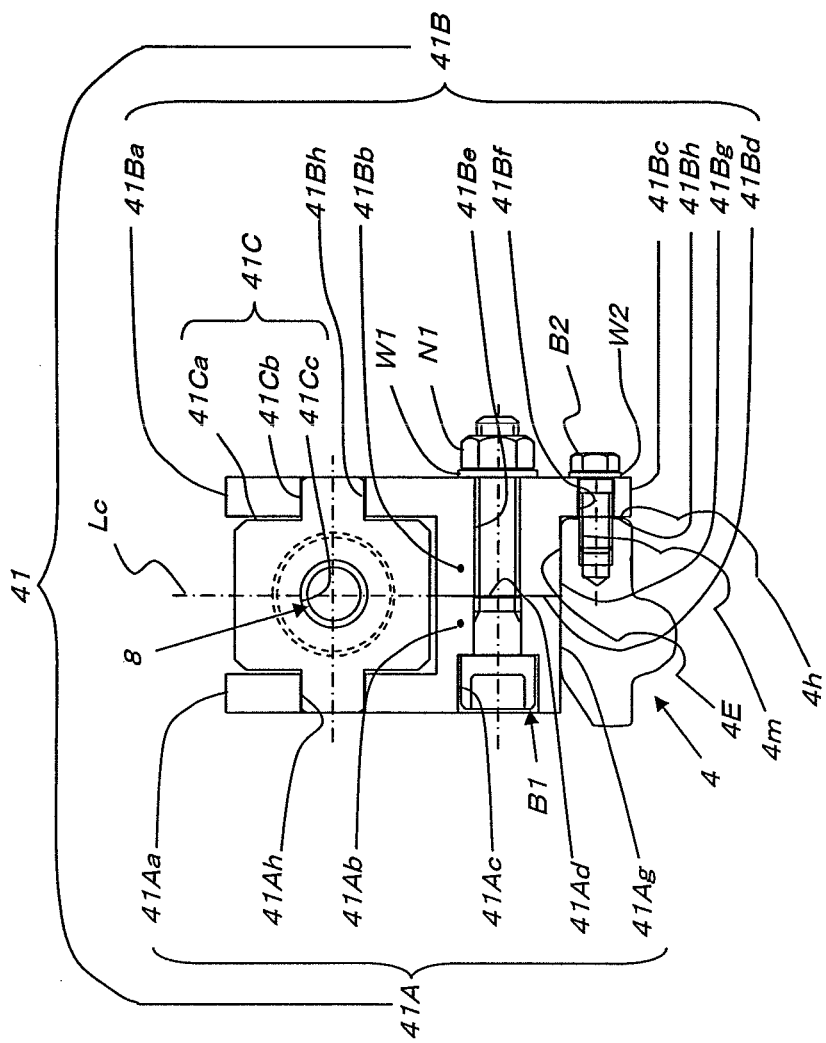
FIG. 3 is a sectional view from arrow B in FIG. 1.

In FIGS. 1 to 3, in particular, in FIG. 3, the jig 41 has a first L-shaped member 41A, a second L-shaped member 41B, and an engaging block 41C. The shape of the first L-shaped member 41A and the second L-shaped member 41B is roughly bilateral symmetric with respect to a center line Lc in the jig 41.

In the jig 41, an end face 41Ad of a bottom 41Ab of the first L-shaped member 41A and an end face 41Bd of a bottom 41Bb of the second L-shaped member 41B make contact with each other and are fixed by an anchor bolt B1, a washer W1, and a nut N1 and integrated with each other.

Figure 19:
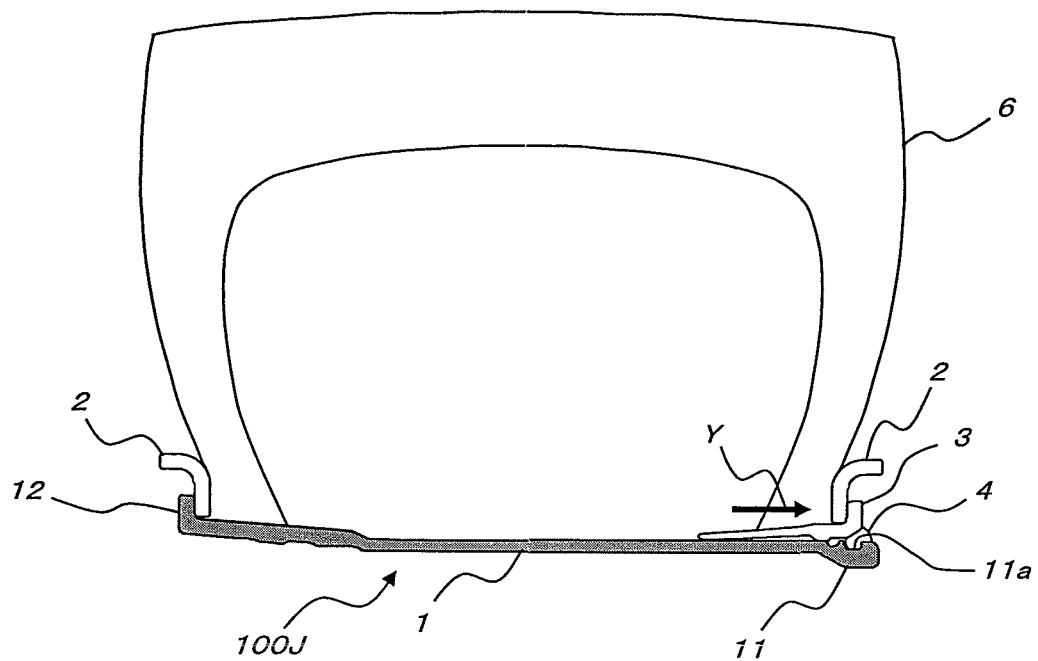
FIG. 19 is a sectional view of a multi-piece rim in a prior art.
Figure 20:
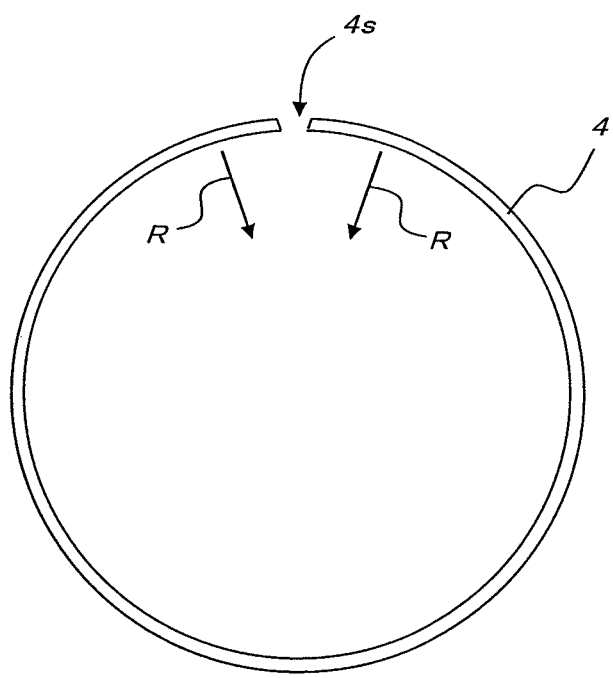
FIG. 20 is a view showing a lock ring as a single component of FIG. 19.

Here, in addition to both ends 4a and 4b of the lock ring 4, each of the jigs 41 and 42 may be attached to, with respect to the lock ring 4, the outer side of a vehicle (the arrow Y-side of FIG. 19) with respect to the axial direction (the horizontal direction of FIG. 19) of a rim base 1 (FIG. 19).

In FIG. 3, in roughly the center of a vertical portion 41Aa in the first L-shaped member 41A and a vertical portion 41Ba in the second L-shaped member 41B, through-holes 41Ah and 41Bh are formed.

Counter pins 41Cb loosely fit in the through-holes 41Ah and 41Bh. A pair of counter pins 41Cb is provided in the engaging block 41C. As a result, the first L-shaped member 41A and the second L-shaped member 41B are configured to be rotatable with respect to the pair of counter pins 42Cb of the engaging block 41C in the jig 41.

The engaging block 41C is formed to be symmetric with respect to a center line Lc1 in FIG. 2 and is formed to be symmetric with respect to the center line Lc in FIG. 3.

In FIG. 3, the engaging block 41C has a block main body 41Ca in the shape of a rectangular parallelepiped and a pair of counter pins 41Cc jutting from the side faces (the right and left side faces in FIG. 3) of the block main body 41Ca.

In the center of the block main body 41Ca in FIG. 3, a through-hole 41Cc penetrating the block main body 41Ca is formed.

In FIG. 2, in right and left end faces of the block main body 41Ca, bearing storage holes 41Cd which are concentric with the through-hole 41Cc are formed, and thrust bearings 41D are fitted in the bearing storage holes 41Cd. The thrust bearings 41D have the function of rotatably supporting the screw bolt 8 and supporting a thrust load that acts on the screw bolt 8.

In FIG. 3, in a lower face 41Bg of the bottom 41Bb of the second L-shaped member 41B, a protrusion 41Bc is formed at an end on the side where the vertical portion 41Ba is located.

In the center of the protrusion 41Bc, a through-hole 41Bf is formed. In FIG. 1, the through-hole 41Bf is formed in the center of the protrusion 41Bc in a board width direction thereof (the horizontal direction in FIG. 1).

In a position in a vertical end face 4h of the lock ring 4, the position corresponding to the through-hole 41Bf of the second L-shaped member 41B, a female screw 4m is formed.

As depicted in FIG. 3, the jig 41 is set in such a way that a lower end face 41Ag of the first L-shaped member 41A and the lower face 41Bg of the bottom 41Bb of the second L-shaped member 41B make contact with an edge portion 4E (an outer periphery) of the lock ring 4 and the vertical end face 4h of the lock ring 4 makes contact with a vertical face 41Bh (a vertical face on the side where the first L-shaped member 41A is located) in the protrusion 41Bc of the second L-shaped member 41B.

The second L-shaped member 41B or the jig 41 integrated therewith is fixed to the vertical end face 4h of the lock ring 4 as a result of a fixing bolt B2 being threadably engaged with the female screw 4m via a washer W2. Since the jig 41 is fixed to the lock ring 4 by the fixing bolt B2 and the female screw 4m, as compared to a case where the lock ring is pressed by the jig by being clamped (sandwiched) thereby, the jig 41 is firmly fixed to the lock ring 4.

Figure 4:
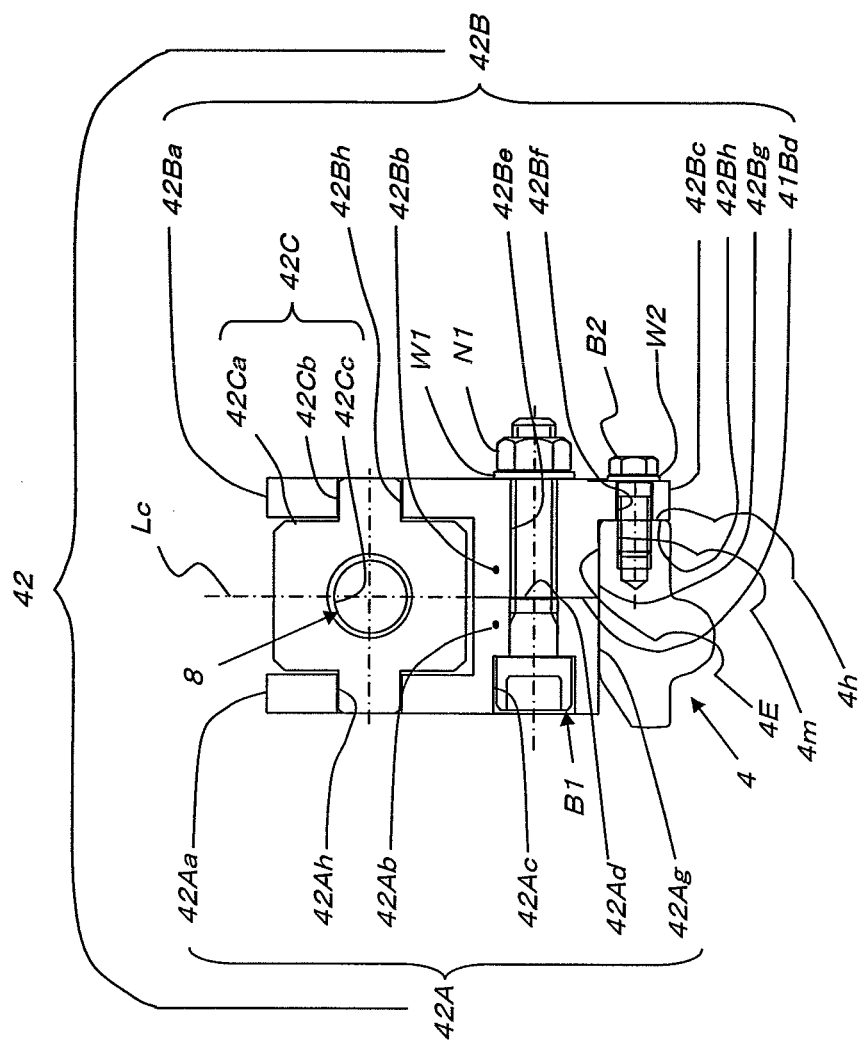
FIG. 4 is a sectional view from arrow C in FIG. 1.

The structure of the jig 42 is depicted in FIGS. 1, 2, and 4, and various structural components forming the jig 42 are identified with numerals to which "42" is attached.

The structure of the jig 42 is similar to the structure of the jig 41 and the description of a common structure with the jig 41 is omitted.

Since a way to attach the jig 42 to the lock ring 4 is also similar to the way to attach the jig 41 to the lock ring 4, the description thereof is omitted.

Numeral 8 in FIGS. 3 and 4 depicts a rod-like expansion member (hereinafter, referred to as a "screw bolt") which will be described later.

In FIGS. 2 and 4, an engaging block 42C of the jig 42 has a block main body 42Ca in the shape of a rectangular parallelepiped. In FIG. 4, in the center of the block main body 42Ca, a female screw (for example, a trapezoidal female screw) is formed, and a through-hole 42Cc penetrating the block main body 42Ca is formed. A female screw (for example, a trapezoidal female screw) of the through-hole 42Cc engages a feed male screw portion (for example, a trapezoidal male screw) 81 for the block main body 42Ca, the feed male screw portion formed in the screw bolt 8.

In FIG. 2, the screw bolt 8 has the feed male screw portion (for example, the trapezoidal male screw) 81, a collar portion 82, and a small-diameter shank 83. The collar portion 82 is formed between the feed male screw portion 81 and the small-diameter shank 83 and is located between the jigs 41 and 42 in FIG. 1.

In the small-diameter shank 83, at an end on the side thereof away from the collar portion 82 (on the right side of FIG. 2), a male screw 84 is formed. On the other hand, at an end in the feed male screw portion 81 on the side away from the collar portion 82 (on the left side of FIG. 2), a male screw portion 85 whose diameter is smaller than the diameter of the feed male screw portion 81 is formed. The male screw 84 and the male screw 85 are screws of the same size. A nut N1 threadably engages the male screw 85 via a washer W1.

Incidentally, it is preferable that processing to prevent the nut N1 threadably engaging the male screw 85 from being loosened is performed. This processing is performed to prevent the nut N1 from being loosened even when the screw bolt 8 is rotated in forward and reverse directions with a tool (for example, a powered wrench) engaging in the nut N1 to increase and reduce the distance between the jigs 41 and 42.

In FIG. 2, to the small-diameter shank 83, the engaging block 41C is attached by the washer W1 and the lock nut N1, and, at both ends of the engaging block 42C in the axial direction thereof, the thrust bearings 41D are mounted.

Processing to prevent the lock nut N1 from being loosened is performed on the lock nut N1 in a publicly known way, and the lock nut N1 is configured in such a way as not to be loosened unless the processing to prevent looseness is ended.

Though not clearly depicted, socket tools can be provided at both ends of the bolt 8.

Incidentally, it is preferable that the screw thread of the bolt 8 is a trapezoidal thread (for example, 30°) which allows the bolt 8 to rotate easily even when a load is acting thereon. As the screw thread of the bolt 8, it is also possible to choose a metric thread or other types of screw thread. However, the trapezoidal thread facilitates rotation and is less likely to be affected by foreign substances such as sandy dust and dust even when the trapezoidal thread is used as a linear guide in a sandy environment such as a mine.

After processing to prevent looseness is ended, when, for example, a socket of a tool (such as a powered wrench) is engaged onto the lock nut N1 and the lock nut N1 is rotated in a reverse direction by bringing the tool into operation, the engaging block 42C threadably engaging the feed male screw portion (for example, the trapezoidal male screw) 81 of the screw bolt 8 moves along the feed male screw portion (for example, the trapezoidal male screw) 81, and the space between the jig 41 and the jig 42 is increased. That is, when the lock nut N1 is rotated in a reverse direction, a gap L (refer to FIG. 1) between end faces 4ae and 4be of the lock ring 4 is increased.

On the other hand, when the lock nut N1 is rotated in a forward direction, the gap L between the end faces 4ae and 4be of the lock ring 4 is reduced.

Figure 5:
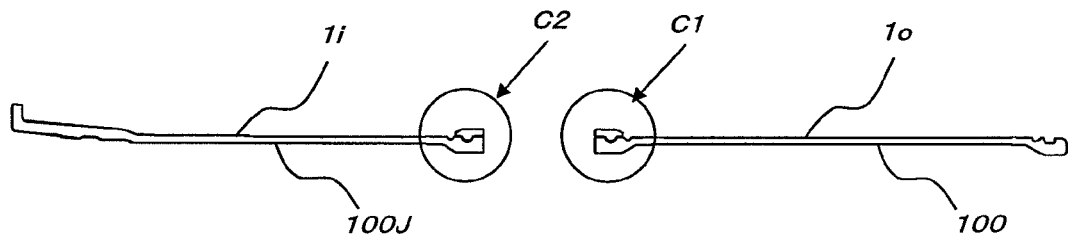
FIG. 5 shows areas at which the edge portions of the lock ring are coupled respectively by applying the jigs of the first embodiment.

It is mainly in parts of double tires, where a rim 100J on the inner side thereof is opposed to the rim 100 on the outer side thereof, that is, regions being denoted by reference symbols C1, C2, respectively, in FIG. 5.

In FIG. 5, numeral 1i represents an inner-side rim base, and numeral 1o represents an outer-side rim base.

The placed jigs 41 and 42 are fixed to the lock ring 4 by using the bolt B2 via the washer W2.

Next, a method for mounting the lock ring 4 on the rim 100 (or the gutter band 11) by use of the Jigs 40, as shown in FIG. 1, is described hereinafter with reference to FIGS. 6 to 12.

In FIGS. 6 to 12, there is described a case of mounting the lock ring 4 in a region of the outer rim 100, on the inner side thereof, (that is, the region C1 in FIG. 5).

Figure 6:
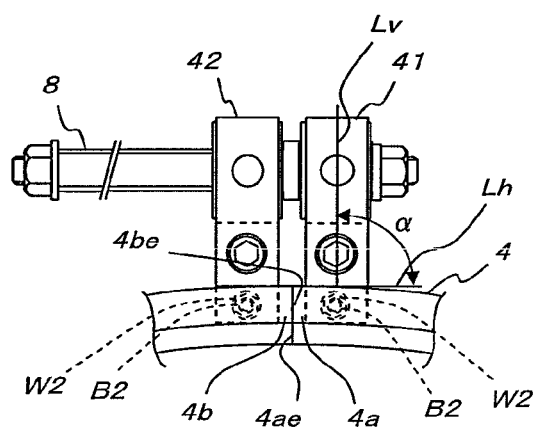
FIG. 6 shows a state where ends of a lock ring are joined with each other when the lock ring is mounted and/or demounted by applying the jigs of the first embodiment.

Firstly, if a lock ring exists as a single piece, the Jigs 41, 42 are placed in close proximity to respective end faces 4ae, 4be of the ends of the lock ring 4, respectively, as shown in FIG. 6.

When the lock ring 4 is a single piece, the respective end faces 4ae, 4be, at a separation spot of the lock ring 4, are abutted against each other by the agency of elastic repulsion force of the lock ring 4 itself (the elastic repulsion force tending to cause a decrease in dimension in the radial direction), as described in the foregoing.

In FIG. 5, numeral 1*i* represents an inner-side rim base, and numeral 1*o* represents an outer-side rim base.

The placed jigs 41 and 42 are fixed to the lock ring 4 by using the bolt B2 via the washer W2.

As depicted in FIG. 6, an angle α formed by a vertical central axis Lv of the jig 41 and a tangent Lh at the end faces 4*ae* and 4*be* of the lock ring 4 is a right angle (90°). Though not depicted in FIG. 6, in a state in which the end faces 4*ae* and 4*be* make contact with each other, the vertical central axis Lv of the jig 41 and a vertical central axis of the jig 42 are parallel to each other.

In a situation shown in FIG. 6, the distance L between the end faces 4*ae* and 4*be* (refer to FIG. 7) of the lock ring 4 is zero.

Subsequently, in FIG. 7, the screw bolt 8 is turned by, for instance, an impact wrench 50, in a counter-clockwise direction (the screw bolt 8 is turned reversely).

As described hereinbefore, when the screw bolt 8 is rotated in a reverse direction, the engaging block 42C threadably engaging the feed male screw portion 81 moves in the direction in which the space between the jig 41 and the jig 42 is increased along the feed male screw portion 81 (refer to FIG. 2), and the gap L between the end faces 4*ae* and 4*be* of the lock ring 4 is increased.

Here, in a state in which the end faces 4*ae* and 4*be* of the lock ring 4 make contact with each other (FIG. 6), an angle θ formed by the end faces 4*ae* and 4*be* is zero (0). However, when the gap L is increased, the angle θ formed by the end faces 4*ae* and 4*be* is increased.

In other words, the angle θ (the angle formed by the direction in which the space between the pair of jigs expands and contracts and the longitudinal direction of each jig) varies with respect to the rotation centers X1 and X2 of the jigs 41 and 42. In addition, the rotation centers X1 and X2 are located on the central axis 8C (refer to FIG. 1) of the bolt 8.

The first L-shaped member 41A and the second L-shaped member 41B are rotatable with respect to the engaging block 41C, the L-shaped member 42A and the L-shaped member 42B are rotatable with respect to the engaging block 42C, and therefore the angle formed by the direction of axis of the screw bolt 8 and the longitudinal direction of the jigs 41 and 42 is changeable.

Figure 7:
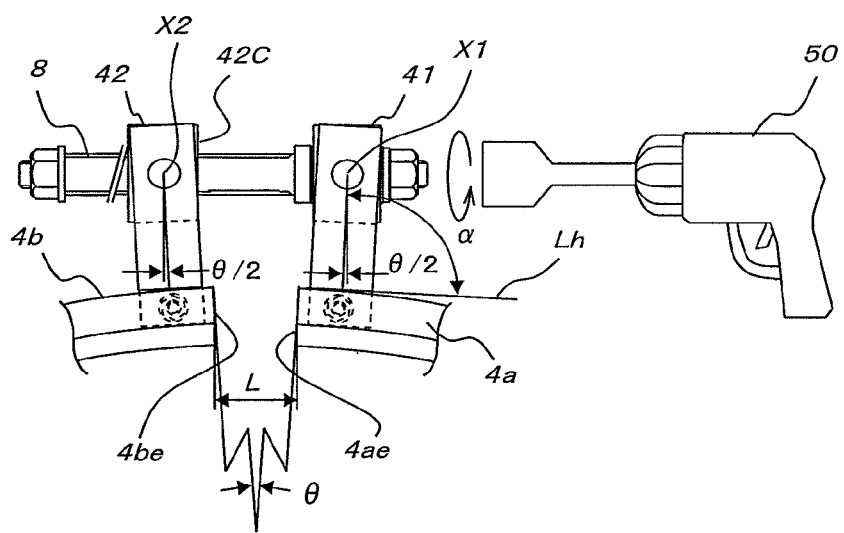
FIG. 7 shows a state where ends of a lock ring are apart from each other when the lock ring is mounted and/or demounted by applying the jigs of the first embodiment.

For example, when the diameter of the lock ring 4 is increased (when the gap L is increased; when a nip angle θ is generated), the jig 41 and the jig 42 are inclined only by an angle θ/2 with respect to a perpendicular to a shaft center of the screw bolt 8 (refer to FIG. 7).

Therefore, when the space L between the jigs 41 and 42 is extended or increased, the tangential direction A4*ae* (refer to FIG. 14) at an end of the lock ring 4 is maintained at a direction that is always perpendicular to the radial direction of the lock ring 4, and a circular state (a circle with an inside diameter of øC in FIG. 14) is maintained on the inside diameter side of the lock ring 4.

As a result, the lock ring 4 is prevented from being deformed into a distorted elliptical shape, making it possible to increase or decrease the diameter in a state in which the lock ring 4 is a perfect circle or is close to a perfect circle.

Figure 8:
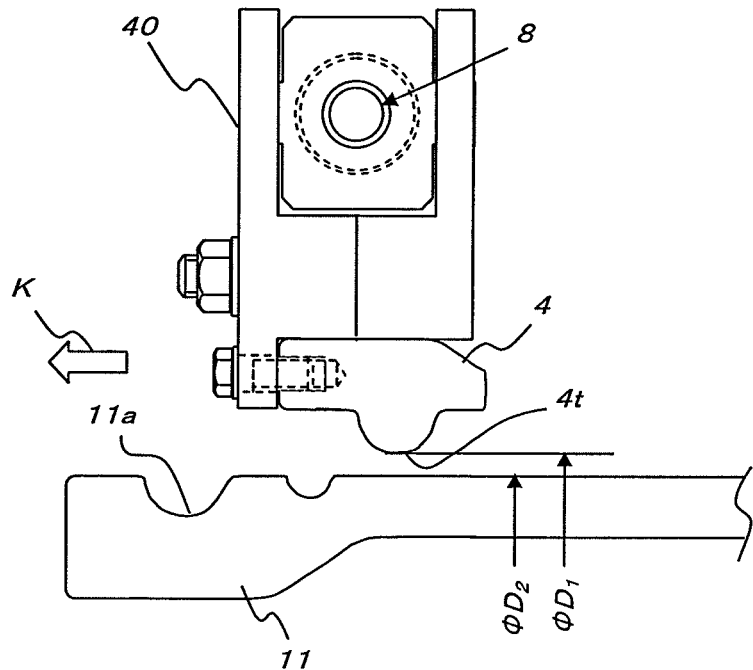
FIG. 8 is a side view showing a relation in dimension between an inside diameter of the lock ring, and an outside diameter of a gutter band when the space between the respective ends of the lock ring is expanded.
Figure 9:
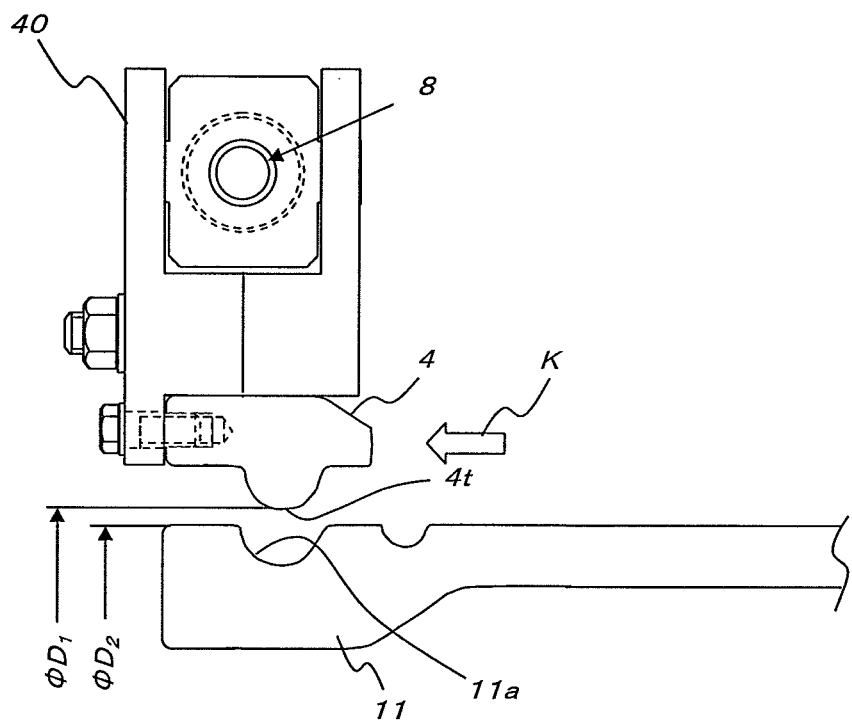
FIG. 9 is a side view showing a state of the lock ring moved as far as above the groove of the gutter band.

As shown in FIGS. 8 and 9, when the jigs 41, 42 are secured to the respective ends of the lock ring 4, the distance L between the respective end faces 4*ae*, 4*be* of the lock ring ends 4*a*, 4*b* is set to a distance where an inside diameter D1 of the lock ring 4, at the apex of a protrusion 4*t*, on the inside diameter side thereof, is larger than an outside diameter D2 of the gutter band 11, corresponding to the outermost diameter thereof.

When the lock ring 4 is attached, in a state in which the distance L between the jigs 41 and 42 is a predetermined distance, the lock ring 4 is moved to the position of a lock ring groove 11*a* of the gutter band 11 (the movement indicated with an arrow K in FIGS. 8 and 9).

Figure 10:
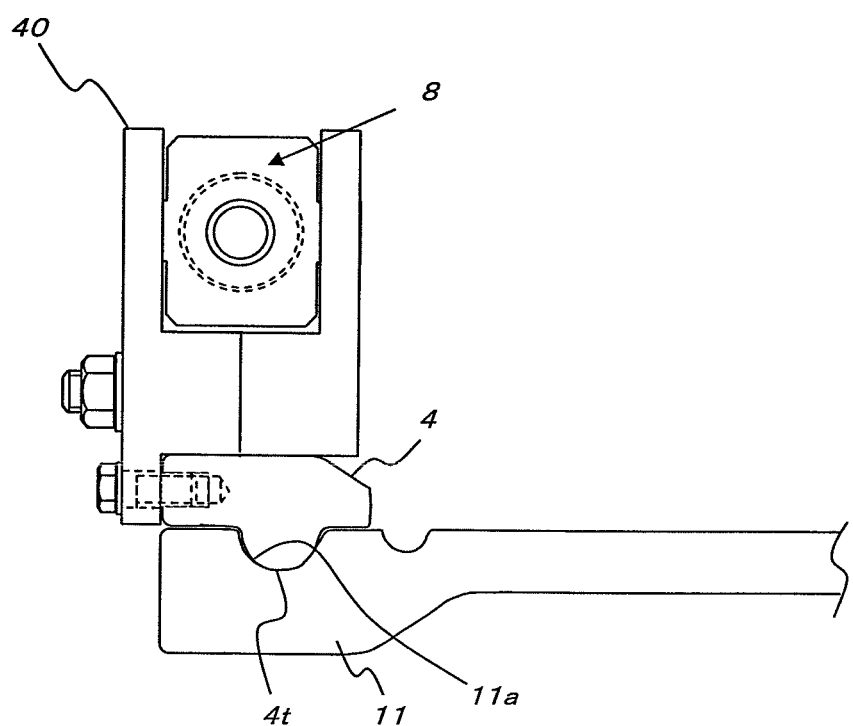
FIG. 10 is a side view showing a state of the lock ring with the jig mounted thereon, being engaged with the groove of the gutter band.

When the lock ring 4 is moved above the lock ring groove 11*a* of the gutter band 11 (the lock ring 4 in a state shown in FIG. 9), the protrusion 4*t* in a region of the lock ring 4 is engaged with the lock ring groove 11*a* of the gutter band 11 (FIG. 10).

Figure 11:
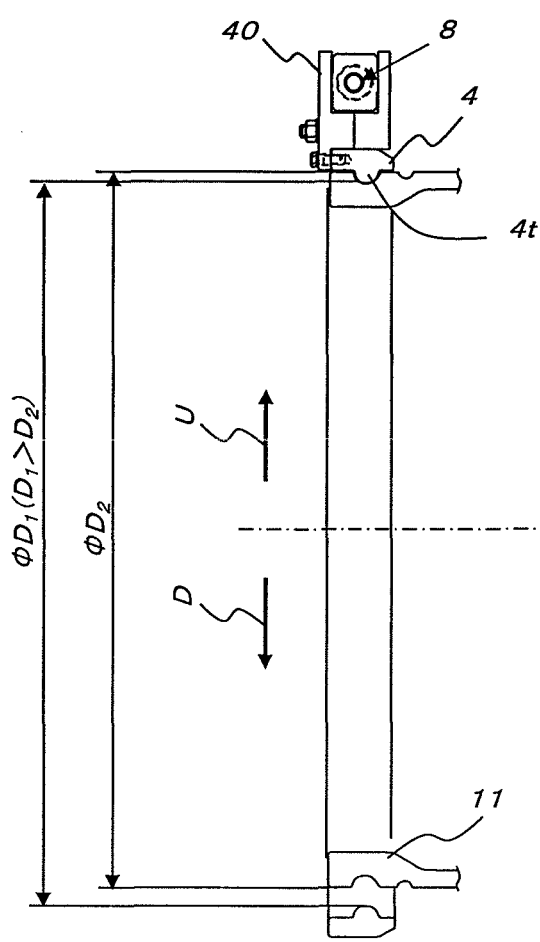
FIG. 11 is a side view showing a positional relationship between the lock ring, and the gutter band, in a state shown in FIG. 10, in total.

Upon engagement of the protrusion 4*t* of the lock ring 4, in an upper region thereof (in the direction of the arrow U in FIG. 11), with the lock ring groove 11*a* of the gutter band 11, the inside diameter ΦD1 of the lock ring 4 is larger than the outside diameter ΦD2 of the gutter band 11, so that a lower (in the direction of the arrow D in FIG. 11) region of the lock ring 4 is parted (downward) from the gutter band 11, as shown in FIG. 11.

With the lock ring 4 in a state shown in FIGS. 10 and 11, the screw bolt 8 is turned in clock-wise direction, thereby causing the distance L between the respective end faces 4*ae*, 4*be* of the lock ring ends to be decreased.

Figure 12:
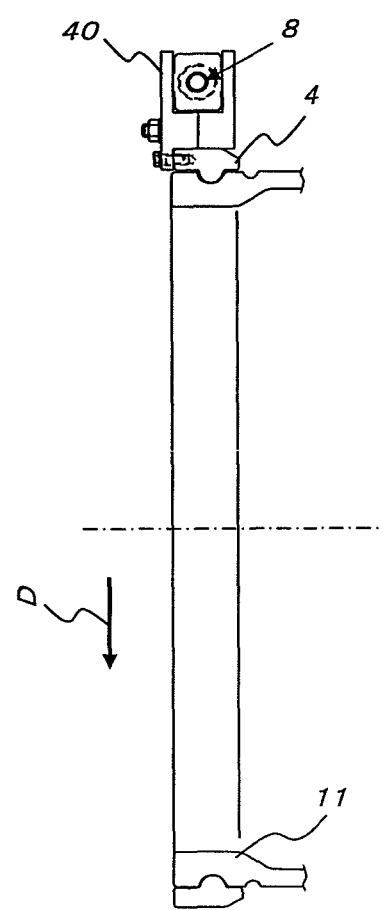
FIG. 12 is a side view showing a state of whole lock ring is mounted to the gutter band.

As a result, the lock ring 4 undergoes deformation along the whole circumference thereof in such a way as to be engaged with the lock ring groove 11*a* of the gutter band 11, as shown in FIG. 12.

Upon completion of engagement of the lock ring 4 with the groove 11*a* of the gutter band 11, the bolt B2 (FIGS. 3 and 4) are loosened and then pulled off (withdrawn), and the jig 40 (41, 42) is demounted from the lock ring ends 4*a*, 4*b*, respectively.

The lock ring 4, in this state, is fitted into the lock ring groove 11*a* by the agency of the elastic repulsion force (resilience) of the lock ring 4 itself to be mounted thereon with certainty.

A method for demounting the lock ring 4 mounted on the rim 100 (or the gutter band 11) can be carried out by operations a sequence of which is reverse to a sequence of the above-mentioned mounting method.

That is, the distance L between the end faces 4*ae* and 4*be* of the lock ring is increased by moving the jigs 41 and 42 away from each other by rotating the expansion member 8, whereby the inside diameter (øD1) of the lock ring 4 is made larger than the outside diameter (øD2) of the gutter band 11. Then, the protrusion 4*t* of the lock ring is removed from engagement with the lock ring groove 11*a* of the gutter band and the lock ring 4 is removed from the rim base 1.

With the first embodiment having such a construction as described in the foregoing, since the jigs 41, 42 in pairs, mounted on the respective ends 4*a*, 4*b* of the lock ring 4 are constructed such that the space between the pair of jigs is expandable, it is possible to maintain with ease and certainty a state where the inside diameter ΦD1 of the lock ring 4 (the inside diameter of the lock ring 4 at the apex of the protrusion 4*t*) is larger than the outside diameter ΦD2 of the gutter band 11 at the time of mounting and demounting the lock ring 4.

Therefore, upon mounting of the lock ring 4, if the jigs 41, 42 in pairs mounted on the ends 4*a*, 4*b* of the lock ring are parted further from each other by turning the screw bolt 8 while resisting elastic repulsion force of the jig 40, urging contraction in the radial direction thereof, it is possible to increase the distance L between respective end faces 4*ae*, 4*be* of the lock ring (4) and to maintain with ease and certainty the state where the inside diameter of the lock ring 4 (the inside diameter ΦD1 of the lock ring 4 is larger than the outside diameter ΦD2 of the gutter band 11.

Hence, it is possible to eliminate the need for forcing a worker to carry out a job of holding a lock ring so as to be disposed at a predetermined position while resisting the elastic repulsion force urging contraction of the lock ring, inward in the radial direction, as in the case of mounting a single-piece lock ring in the past, the job being extremely difficult and requiring excessive labor, so that the job can be easily and safely carried out.

Further, with the first embodiment, the protrusion 4*t* in the region in close proximity to the respective ends of the lock ring 4 is engaged with the groove 11*a* of the gutter band 11, and the jigs 41, 42 are caused to approach each other by turning the screw bolt 8 to thereby decrease the distance L between the respective end faces 4*ae*, 4*be* of the lock ring 4, whereupon the lock ring 4 can be engaged with the lock ring groove 11*a* of the gutter band 11, along the whole circumference of the lock ring 4. For this reason, it is only during a brief period of such a job as described above that the lock ring 4 need be propped up, so that there is no need for a worker to prop up a heavy lock ring for many hours while resisting the elastic repulsion force of the lock ring upon mounting the lock ring 4 at the predetermined position, and a whole work can be easily and safely carried out.

Still further, with the first embodiment, in a case that the jigs 41, 42 are caused to approach each other by, for example, turning the screw bolt 8, the lock ring 4 can be engaged with the lock ring groove 11*a* by the agency of the elastic repulsion force tending to contract inward in the radial direction.

Accordingly, engagement of the lock ring 4 against the lock ring groove 11*a* is ensured, and there will be no possibility that the lock ring is disengaged from the lock ring groove 11*a* by the agency of force caused by air pressure of a tire, acting in an axial direction, (force in the direction of the arrow Y in FIG. 19) when air is pumped into the tire.

Since the lock ring 4 is engaged with the lock ring groove 11*a* of the gutter band 11 with certainty, the tire 6 can be accurately assembled with the rim.

When the lock ring is removed by using the jig 40 of the first embodiment, as in the above-described method of attachment, the distance L between the end faces 4*ae* and 4*be* of the lock ring is increased by moving the jigs 41 and 42 away from each other by rotating the screw bolt 8 (rotating the screw bolt 8 in a reverse direction), for example, whereby a state in which the inside diameter øD1 of the lock ring 4 is larger than the outside diameter øD2 of the gutter band 11 is maintained, and the protrusion 4*t* of the lock ring is removed from engagement with the lock ring groove 11*a* of the gutter band 11 and the lock ring 4 is removed from the rim base 1. At the time of removal of the lock ring 4, the lock ring 4 which is heavy in weight is supported only while operation is performed by which the protrusion 4*t* of the lock ring is removed from engagement with the lock ring groove 11*a* of the gutter band 11 and the lock ring 4 is removed from the rim base 1. Therefore, there is no need for a worker to keep supporting the lock ring 4 which is heavy in weight while pushing against the elastic repulsion force thereof for a long time.

In the first embodiment of FIGS. 1 to 12, in the screw bolt 8, the jig 41 cannot move in an axial direction with respect to the screw bolt 8 but can rotate freely. On the other hand, in the jig 42, the female screw (normal right-hand screw) formed in the jig 42 threadably engages the male screw formed in the screw bolt 8, and, when the screw bolt 8 is rotated in a clockwise direction, the space L between the jigs 41 and 42 is decreased; when the screw bolt 8 is rotated in a counterclockwise direction, the space L between the jigs 41 and 42 is increased.

On the other hand, it is also possible to form a right-hand screw and a left-hand screw (of which both are male screws) in the screw bolt 8. For example, it is possible to form a right-hand screw (a female screw) in the jig 41 and make the right-hand screw of the screw bolt 8 threadably engage the right-hand screw of the jig 41, and form a left-hand screw (a female screw) in the jig 42 and make the left-hand screw of the screw bolt 8 threadably engage the left-hand screw of the jig 42.

In that case, when the screw bolt 8 is rotated in a clockwise direction, the space between the jigs 41 and 42 is decreased, and, when the screw bolt 8 is rotated in a counterclockwise direction, the space between the jigs 41 and 42 is increased.

Figure 13:
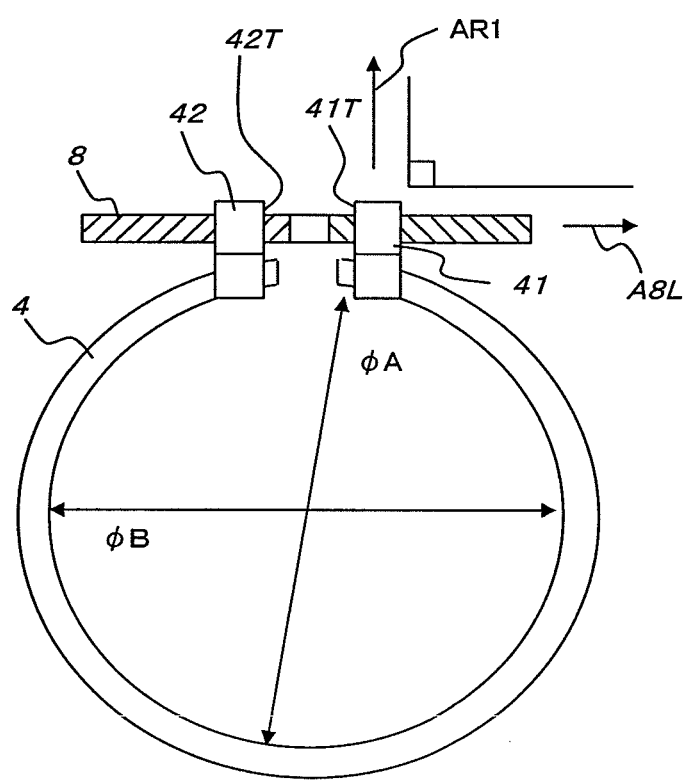
FIG. 13 is a diagram describing an example in which the angle formed by the direction in which the space of the jig expands and contracts and the longitudinal direction of the jig is fixed.

FIG. 13 depicts a case where the angle formed by the direction (the direction of axis of the screw bolt 8) in which the space L between the jigs 41 and 42 expands and contracts and the longitudinal direction of each of the jigs 41 and 42 is fixed. In FIG. 13, a case where the screw bolt 8 is rotated in a counterclockwise direction to move the jigs 41 and 42 away from each other will be described.

When the angle formed by the direction of axis of the screw bolt 8 and the vertical center lines of the jigs 41 and 42 is fixed at a right angle, if the jigs 41 and 42 are moved away from each other, the inside diameter of the lock ring 4 is not increased uniformly, and the lock ring inside diameter represented by symbol øA in FIG. 13 tends to become smaller than the lock ring inside diameter represented by symbol øB (øB>øA). That is, the inside diameter side of the lock ring 4 tends to take the form of a distorted elliptical shape, not a perfect circle.

If the inside diameter side of the lock ring 4 takes the form of a distorted elliptical shape, not a perfect circle, even when the space between the jigs 41 and 42 is increased, the inside diameter øD1 of the lock ring 4 does not become larger than the outside diameter øD2 of the gutter band 11 around the entire perimeter, which makes it impossible to move the lock ring 4 to an appropriate position on the gutter band 11 (which is not depicted in FIG. 13).

This makes it is necessary to increase further the space between the jigs 41 and 42.

The reason, why the inside diameter side of the lock ring 4 does not increase in diameter while maintaining a perfect circle even when the space between the jigs 41 and 42 is increased, is that, when the distance L between the end faces of the lock ring 4 is increased by increasing the space between the jigs 41 and 42, the bending moment applied to the lock ring 4 from the jigs 41 and 42 is proportional to the distance from the jig 41 or 42 to each portion of the lock ring 4.

In FIG. 13, since the jig 41 is fixed to (pressed against) the screw bolt 8 and the jig 42 threadably engages the screw bolt 8, there is no relative movement between the jigs 41 and 42 and the ends of the lock ring 4.

As a result, an end 41T of the jig 41 or an end 42T of the jig 42 and a central axis direction A8L of the screw bolt 8 maintain a constant angle (a right angle) (in FIG. 13, only the angle formed by an orientation AR1 of the end 41T of the jig 41 and the central axis direction A8L of the screw bolt 8 is depicted).

When the space between the jigs 41 and 42 is further increased, as depicted in FIG. 13, since the jig 41 is press-fitted to the screw bolt 8 and the jig 42 engages the screw bolt 8, the angle formed by the orientation AR1 of the end 41T of the jig 41 and the central axis direction A8L of the screw bolt 8 becomes constant (a right angle) and remains constant.

As a result, the lock ring 4 changes in such a way as to decrease the curvature near an area in which the jigs 41 and 42 are fixed. Such a change in the curvature makes it impossible to maintain a perfect circle state of the inside diameter side of the lock ring 4 when the space between the jigs 41 and 42 is increased.

Figure 14:
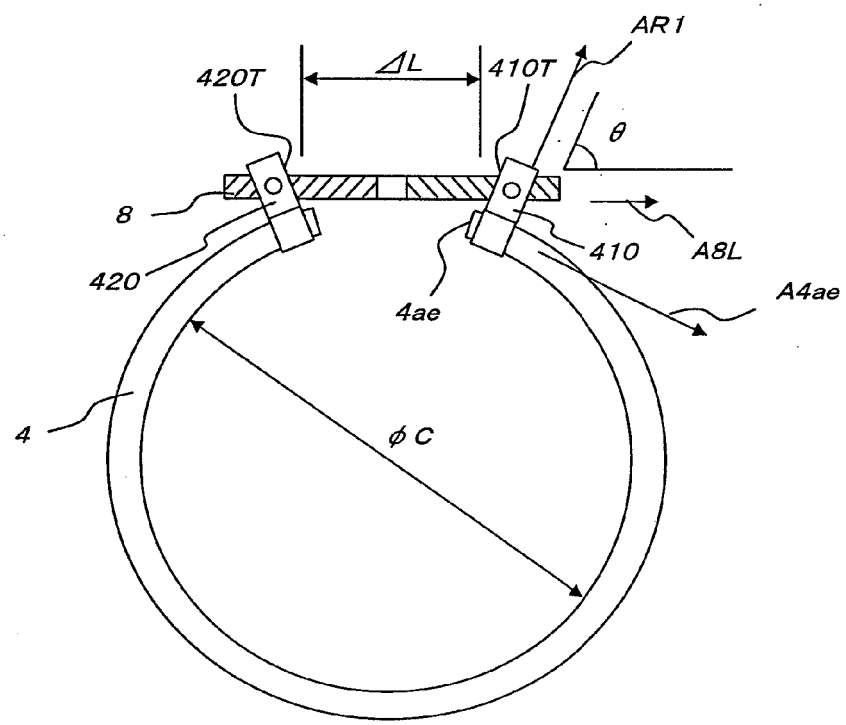
FIG. 14 is a front view showing the second embodiment of the invention.

In the first embodiment, both the jig 41 and the jig 42 are configured such that the jig 41 and the jig 42 can rotate about the central axis of the screw bolt 8 by the presence of the pair of counter pins 41Cb and 42Cb provided in the respective L-shaped member engaging blocks 41C and 42C. As a result, according to the first embodiment, since the angle formed by the direction (the direction of axis of the screw bolt 8) in which the space L between the pair of jigs 41 and 42 expands and contracts and the longitudinal direction of each of the jigs 41 and 42 is changeable, when the space between the jigs is made to expand and contract (is extended or increased), the tangential direction (A4$ae$: FIG. 14) at an end of the lock ring 4 is maintained at a direction that is always perpendicular to the radial direction of the lock ring 4.

As a result, a circular state (a circle with an inside diameter of øC in FIG. 14) is maintained on the inside diameter side of the lock ring 4.

This keeps the shape of the lock ring 4 from changing into a distorted elliptical shape and makes it possible to increase or decrease the diameter in a state in which the lock ring 4 is a perfect circle or is close to a perfect circle.

Next, there is described hereinafter a second embodiment of the invention with reference to FIGS. 14 to 18.

FIG. 14 shows the overview of the second embodiment of the invention.

As shown in FIG. 14, in the second embodiment, jigs 410, 420, fixedly attached to respective ends of a lock ring 4, are made up such that angles (in FIG. 14, an angle θ is shown by way of example) which respective ends 410T, 420T of the jigs 410, 420 form with a center axis A8L of a screw bolt 8 are freely variable.

Accordingly, in FIG. 14, although the screw bolt 8 is in mesh with the jigs 410, 420, respectively, as a space ΔL between the jigs 410, 420 becomes ether wider, or narrower, so the angles which the respective ends 41T, 42T form with the center axis A8L are gradually changed. Then, occurrence of abrupt variation in curvature at parts of the lock ring 4, in close proximity to the jigs 410, 420, respectively, is prevented.

As a result, a direction (the direction of the arrow A4$ae$) of the tangent at the end of the lock ring 4 is always maintained at right angles to the radial direction connecting the center of the lock ring 4, on the inside diameter side thereof, to the end of the lock ring 4, so that the lock ring 4, on the inside diameter side thereof, can be kept in the state of a circle in shape (in FIG. 14, a circle with an inside diameter øC) with greater ease.

Figure 15:
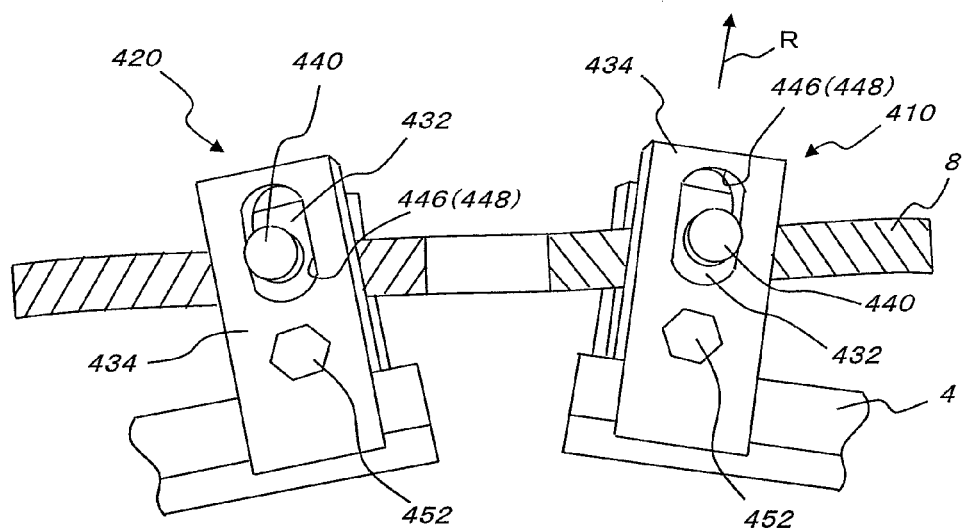
FIG. 15 is a front view showing the principal part of the second embodiment.
Figure 16:
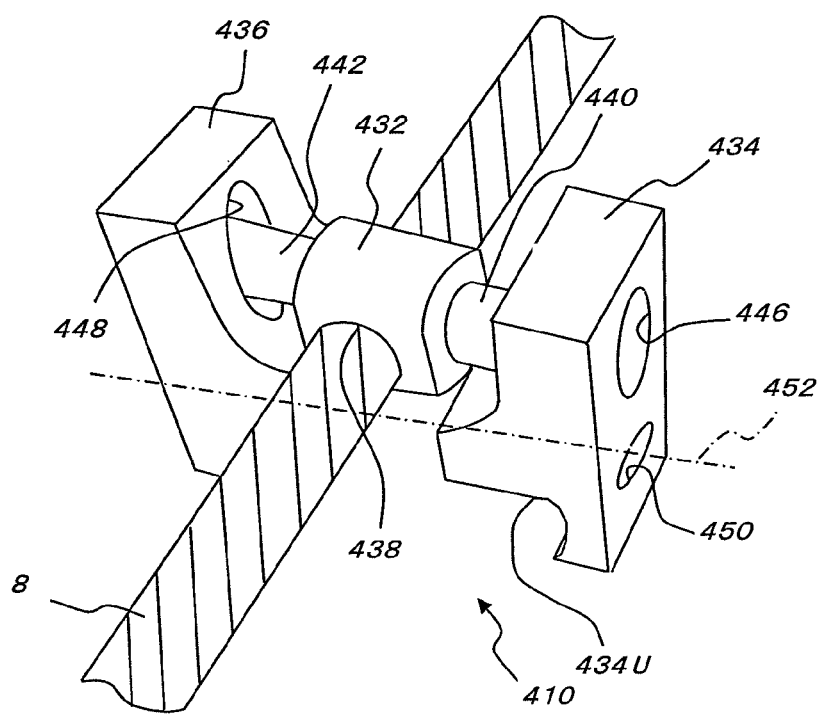
FIG. 16 is an enlarged partly exploded view of a jig according to the second embodiment.
Figure 17:
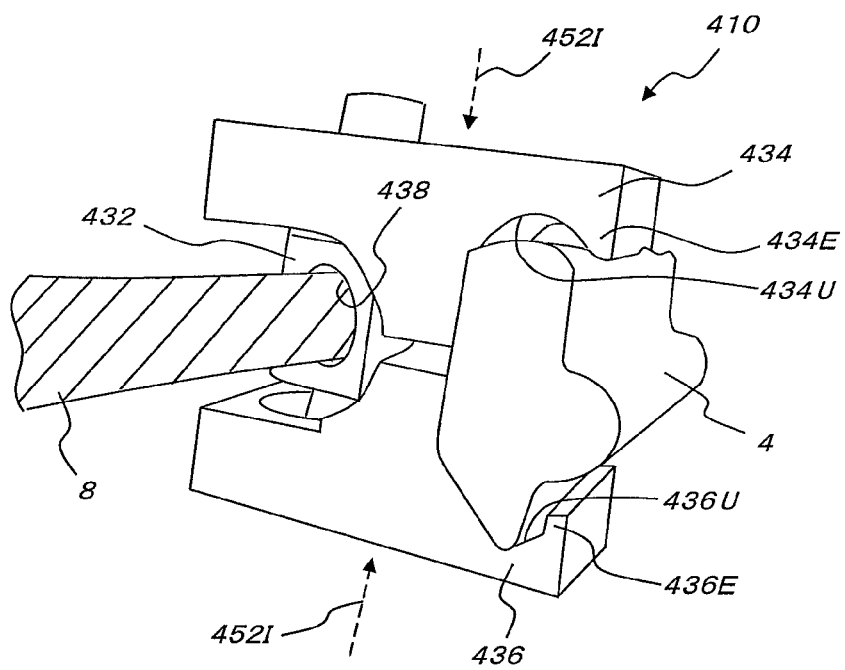
FIG. 17 is an enlarged partly exploded view showing a relation between the jig and a lock ring, according to the second embodiment.

Referring to FIGS. 15 to 17, there is described hereinafter a construction for enabling the angles which the respective ends 410T, 420T of the jigs 410, 420 form with the center axis A8L of the screw bolt 8 to be variable. In FIGS. 16 and 17, only the jig 410 is shown.

In FIGS. 15 and 16, in the jigs 410 and 420, portions corresponding to the first L-shaped member 41A and the second L-shaped member 41B and the first L-shaped member 42A and the second L-shaped member 42B in the jigs 41 and 42 of the first embodiment are formed of a block portion 432 and two clamp members 434 and 436 that clamp the block portion 432.

As shown in FIGS. 16 and 17, a female screw 438 is formed in the block 432 so as to penetrate therethrough. Further, in FIGS. 16 and 17, there is shown a state of the screw bolt 8 being in mesh with the female screw 438 penetrating through the block 432 to be inserted therein.

As clearly shown in FIG. 16, the block 432 is provided integrally with shafts 440, 442.

The shafts 440, 442 each are extended in a direction orthogonal to the screw bolt 8. In other words, the shafts 440, 442 each are extended so as to cross the axial direction of the female screw 438 penetrating through the block 432, at right angles.

The clamp member 434 has a long hole 446 penetrating therethrough, and the clamp member 436 has a long hole 448 penetrating therethrough. And the shaft 440 is inserted into the long hole 446, and the shaft 442 is inserted into the long hole 448.

In the clamp member 434, a groove 434U is formed, and the cross-sectional shape of the groove 434U corresponds to the lock ring 4 and is shaped like a letter U. Moreover, though not clearly depicted in FIG. 17, a groove 436U having a virtually U-shaped cross section is also formed in the clamp member 436.

The long holes 446, 448 each are formed so as to have a major axis in the radial direction of the lock ring 4, that is, in the direction indicated by the arrow R in FIG. 15. The shafts 440, 442 are freely rotatable within the long holes 446, 448, respectively, and freely movable in the radial direction of the lock ring 4.

A through-hole 450 is provided in the clamp members 434, 436, respectively, and a female screw is formed in the through-hole 450 of the clamp member 436.

In FIGS. 15 to 17, a bolt 452 (in FIG. 16, shown by a dash and dotted line; in FIG. 17, a direction in which the same is tightened up is shown by the arrows 4521 in pairs) is inserted into the respective through-holes 450, and is in mesh therewith, so that the clamp members 434, 436 are joined integrally with each other, the block 432 being clamped therebetween by tightening up the bolt 452.

As depicted in FIG. 17, ends 434E and 436E of the clamping portions 434 and 436 on the side where the lock ring is located are formed into the shape of a clamp, and, when the bolt 452 is tightened and the clamping portions 434 and 436 are fastened as indicated with an arrow 4521, the U-shaped grooves 434U and 436U formed in the clamp shaped ends 434E and 436E, respectively, engage the lock ring 4. Therefore, the block 432, the clamp members 434, 436, and the lock ring 4 are integrally fixed to each other.

With adoption of the construction shown in FIGS. 15 to 17, the screw bolt 8 engages with the female screw 438 penetrating through the block 432, so that the same operation effect of the first embodiments can be carried out.

In addition, since the shafts 440, 442 of the block 432 are inserted into the long holes 446, 448, respectively, even if there occurs a slight increase or decrease in the space between the clamp members 434, 436, and the clamp members 434, 436 are not in parallel with each other, the angle θ in FIG. 14 is freely variable because the shafts 440, 442 are rotatable within the long holes 446, 448, respectively, and freely movable in the radial direction of the lock ring 4. For this reason, occurrence of small variation in curvature at parts of the lock ring 4, in regions in close proximity to the jigs 410, 420, respectively, is prevented.

In other words, even if there occurs an increase or a decrease in the inside diameter of the lock ring 4 (FIG. 14, the inside diameter øC) due to an increase or a decrease in the space ΔL between the jigs 410, 420, variation in respect of the space ΔL, the inside diameter øC, and the angle θ will be absorbed by the long holes 446, 448, respectively. As a result, even if there occurs variation in the space ΔL between the jigs 410, 420, the lock ring 4, on the inside diameter side thereof, can be kept in the state of a perfect circle in shape with greater ease.

Figure 18:
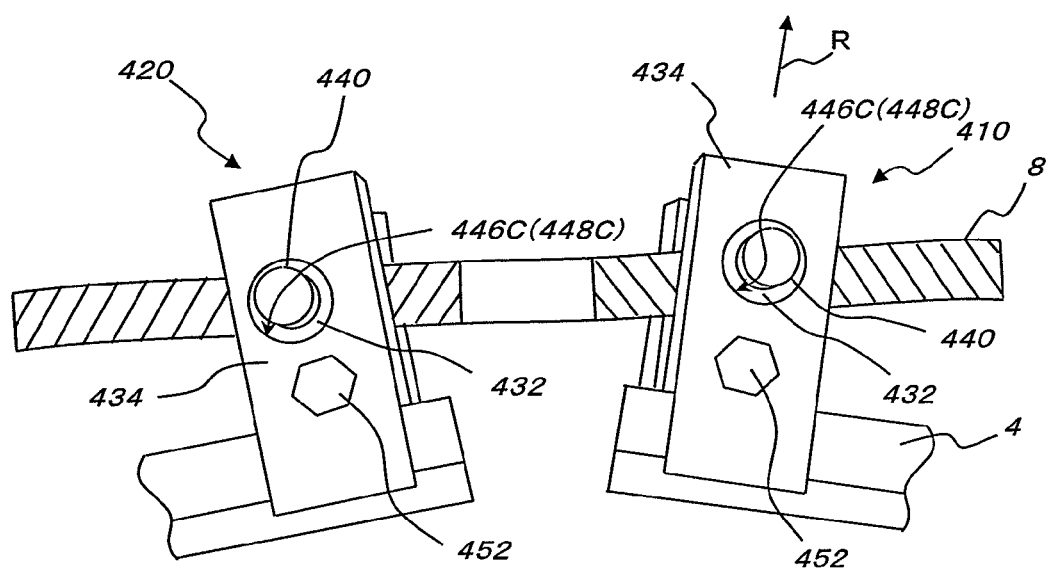
FIG. 18 is a front view showing the principal part of a variation of the second embodiment.

As mentioned above, with the second embodiment shown in FIGS. 15 to 17, the long hole 446 is penetrated through the clamp member 434, the long hole 448 is penetrated through the clamp member 436, and the long holes 446, 448 each are formed so as to have the major axis in the radial direction of the lock ring 4, that is, in the direction indicated by the arrow R in FIG. 15, as described in the foregoing. However, as shown in FIG. 18, in place of the long holes 446, 448, use may be made of openings 446C, 448C, circular in cross section, formed in the clamp members 434, 436, respectively. And the shafts 440, 442 are freely rotatable, and freely movable within the openings 446C, 448C, circular in cross section, respectively.

Further, respective cross-sectional shapes of the openings (through-holes) formed in the clamp members 434, 436, respectively, are not limited to an ellipse (a long hole), and a perfect circle, but openings having other cross-sectional shapes may be formed.

The second embodiment of the invention described with reference to FIGS. 14 to 18 is the same in respect of constructions in other respects, and operation effect as the first embodiment.

Having described the embodiments with reference to various drawings, it is to be pointed out that those embodiments are described for illustrative purposes only and changes and variations may be made in the invention without departing from the spirit and scope thereof.

For example, the present invention described in the foregoing is applicable to not only a wheel provided with a disc but also a rim without a disc attached thereto.

Further, the present invention is applicable to not only the case of double tires but also the case of a single tire provided that use is made of the "one piece" lock ring. Furthermore, the present invention is applicable to not only a rim of a front wheel but also a rim of a rear wheel.

Though not depicted in the drawings, it is preferable that the present invention is applied to a 49 to 63 inch multi-piece wheel for a construction machine, for example.

Moreover, though not depicted in the drawings, it is preferable that the bolt (8) used in the present invention is 15 to 25 mm in diameter. A bolt less than 15 mm in diameter may lack stiffness; if the diameter exceeds 25 mm, the weight of a bolt becomes too heavy in weight. In addition, it is preferable that the length of the bolt (8) is 300 mm or less. If the bolt is too short, the space generated when the jigs are moved away from each other becomes narrow, which makes it impossible to remove the lock ring. On the other hand, if the bolt is too long, the bolt may interfere with other parts.

Furthermore, a lock ring mounting/demounting jig of the present invention is configured such that the lock ring mounting/demounting jig can be disassembled, and, when a component part is damaged or worn away, the component part can be replaced.

EXPLANATION OF REFERENCE NUMERALS AND SYMBOLS

1 . . . rim base
4 . . . lock ring
8 . . . screw bolt
11 . . . gutter band
40, 41, 42 . . . jig

The invention claimed is:

1. A lock ring mounting/demounting jig, wherein
the lock ring mounting/demounting jig is formed of a pair of jigs,
the pair of jigs can be attached at both ends of a lock ring and on a radial outside of the lock ring,
the jig is constructed so as to make an angle that is changeable, the angle is formed by a longitudinal direction of each jig and a direction in which a space between the pair of jigs expands and contracts and
rotation centers of jigs are located on a central axis of a bolt connecting the jigs, wherein the angle can be changed around each of the rotation centers, the angle being formed by the longitudinal direction of each jig and the direction in which the space between the pair of jigs expands and contracts.

2. The lock ring mounting/demounting jig according to claim 1,
wherein female screw holes are formed at both ends of the lock ring,
fixing bolts threadably engage the female screw holes, and
the fixing bolts are placed through through-holes formed in support members of the jigs.

3. The lock ring mounting/demounting jig according to claim 1, wherein
each of the pair of jigs is further divided into two parts, and the lock ring is fixed by being clamped between the two parts.

4. The lock ring mounting/demounting jig according to claim 3, wherein
the two parts have formed therein grooves of U-shaped cross section, and
the two parts clamp the lock ring in a state in which the lock ring is inserted in the grooves of U-shaped cross section.

5. The lock ring mounting/demounting jig according to claim 1, comprising:
a rod-like expansion member with a male screw portion, wherein
one of the pair of jigs includes a support mechanism that rotatably supports the expansion member and supports a thrust acting on the expansion member, and
in the other of the pair of jigs, a female screw hole threadably engaging the male screw portion of the expansion member is formed, and the space between the pair of jigs expands or contracts by rotation of the expansion member.

6. The lock ring mounting/demounting jig according to claim 1, wherein
the expansion member includes two male screw portions in which male screws, of which one is opposite in direction to the other, are formed,
in each of the pair of jigs, a female screw hole is formed, female screws of the female screw holes in the pair of jigs are opposite in direction,
one male screw portion of the expansion member threadably engages the female screw hole of one jig, the other male screw portion of the expansion member threadably engages the female screw hole of the other jig, and the space between the pair of jigs expands or contracts by rotation of the expansion member.

7. The lock ring mounting/demounting jig according to claim 1, wherein
each of the pair of jigs is attached to an outer side of a vehicle with respect to an axial direction of a rim base to which the lock ring is attached.

* * * * *